US008828544B2

(12) United States Patent
Lim et al.

(10) Patent No.: US 8,828,544 B2
(45) Date of Patent: Sep. 9, 2014

(54) PROCESS AND APPARATUS FOR DEPOSITING NANOSTRUCTURED MATERIAL ONTO A SUBSTRATE MATERIAL

(75) Inventors: Kok Seng Lim, Victoria (AU); Jonian Ivanov Nikolav, Victoria (AU)

(73) Assignee: Commonwealth Scientific And Industrial Research Organisation, Australian Capital Territory (AU)

( * ) Notice: Subject to any disclaimer, the term of this patent is extended or adjusted under 35 U.S.C. 154(b) by 120 days.

(21) Appl. No.: 13/264,718

(22) PCT Filed: Apr. 19, 2010

(86) PCT No.: PCT/AU2010/000436
§ 371 (c)(1),
(2), (4) Date: Mar. 14, 2012

(87) PCT Pub. No.: WO2010/118480
PCT Pub. Date: Oct. 21, 2010

(65) Prior Publication Data
US 2012/0178972 A1    Jul. 12, 2012

(30) Foreign Application Priority Data

Apr. 17, 2009   (AU) .................................. 209901632

(51) Int. Cl.
| | | |
|---|---|---|
| B32B 15/00 | (2006.01) |
| B32B 17/00 | (2006.01) |
| B32B 19/00 | (2006.01) |
| B01J 27/00 | (2006.01) |
| B01J 21/00 | (2006.01) |
| B01J 37/02 | (2006.01) |
| C23C 18/12 | (2006.01) |
| B01J 29/06 | (2006.01) |
| B01J 37/34 | (2006.01) |
| B01J 23/75 | (2006.01) |
| B01J 2/16 | (2006.01) |
| B01J 23/00 | (2006.01) |
| B01J 35/00 | (2006.01) |
| B01J 2/00 | (2006.01) |
| B01J 23/745 | (2006.01) |
| B01J 23/80 | (2006.01) |
| B01J 23/06 | (2006.01) |
| B01J 8/18 | (2006.01) |
| B01J 23/10 | (2006.01) |
| B01J 23/70 | (2006.01) |
| B01J 23/04 | (2006.01) |
| B01J 23/38 | (2006.01) |

(52) U.S. Cl.
CPC ............. *B01J 2/006* (2013.01); *B01J 37/0221* (2013.01); *B01J 23/10* (2013.01); *C23C 18/1258* (2013.01); *B01J 29/06* (2013.01); *B01J 37/349* (2013.01); *B01J 23/75* (2013.01); *B01J 2/16* (2013.01); *B01J 23/002* (2013.01); *B01J 23/70* (2013.01); *B01J 23/04* (2013.01); *B01J 35/006* (2013.01); *B01J 23/745* (2013.01); *B01J 35/002* (2013.01); *B01J 23/80* (2013.01); *B01J 23/38* (2013.01); *B01J 2523/00* (2013.01); *B01J 23/06* (2013.01); *C23C 18/1216* (2013.01); *B01J 8/1827* (2013.01); *Y10S 977/773* (2013.01); *Y10S 977/89* (2013.01)
USPC ............. 428/403; 502/87; 502/100; 502/201; 502/224; 502/232; 502/349; 502/355; 977/773; 977/890

(58) Field of Classification Search
USPC ............ 428/403; 502/87, 100, 201, 224, 232, 502/349, 355; 977/773, 890
See application file for complete search history.

(56) References Cited

U.S. PATENT DOCUMENTS

| | | |
|---|---|---|
| 3,247,014 A | 4/1966 | Goldberger |
| 5,876,793 A | 3/1999 | Sherman et al. |
| 6,440,895 B1 | 8/2002 | Tonkovich et al. |
| 6,811,881 B1 | 11/2004 | Clough |
| 7,220,398 B2 | 5/2007 | Sutorik et al. |
| 2004/0065171 A1 | 4/2004 | Hearley et al. |

FOREIGN PATENT DOCUMENTS

| | | |
|---|---|---|
| CA | 2669009 | 5/2008 |
| WO | WO 91/07244 | 5/1991 |
| WO | WO 2007/095376 | 8/2007 |

OTHER PUBLICATIONS

Deguchi et al., Spray Pyrolysis in a Circulating Fluidized Bed 29(1) (1996) *Journal of Chemical Engineering of Japan*, pp. 25-28.
International Search Report for Appl No. PCT/AU2010/000436 dated Jun. 18, 2010.
International Preliminary Report on Patentability for Appl No. PCT/AU2010/000436 dated Jun. 16, 2011.
Extended European Search Report mailed on Jan. 9, 2014 from corresponding European Patent Application No. 10763989.0 (7 pages).
PCT Written Opinion issued in corresponding PCT/AU2010/000436, mailed on Jun. 18, 2000.

*Primary Examiner* — Samantha Shterengarts
(74) *Attorney, Agent, or Firm* — Ladas & Parry, LLP (57) ABSTRACT

A process for depositing nanostructured material onto a particulate substrate material comprising the steps of: a) preparing a precursor material; b) forming an atomized dispersion containing nanophased material when subjecting said precursor material to elevated temperature; and c) contacting the atomized dispersion with the substrate material to deposit the nanophased material on the substrate material. The substrate material is in mobile and particulate form for contacting step (c). An apparatus for carrying out the process is also disclosed.

39 Claims, 7 Drawing Sheets

PROCESS AND APPARATUS FOR DEPOSITING NANOSTRUCTURED MATERIAL ONTO A SUBSTRATE MATERIAL

CROSS-REFERENCE TO RELATED APPLICATIONS

This application is the U.S. National Stage of International Patent Application No. PCT/AU2010/000436 filed on Apr. 19, 2010, which claims priority to Australian Patent Application Number 2009901632 filed on Apr. 17, 2009, the disclosures of which are hereby incorporated by reference in their entirety.

This invention relates to a process and apparatus for depositing nanostructured material onto a substrate material in particulate (powder) form.

Nanostructured materials, that is, materials having average grain size in the nanometric range and homogeneous structure at this scale, may have different, improved and/or important properties or functionalities which usually cannot be achieved from the same material having grain size on a larger scale. Improvement in properties can result from a range of phenomena having a dominating effect at nanoscale level (such as grain boundaries, triple junctions, etc.) which have been subject of extensive investigation by the scientific community. If, for example, the average grain size of given material is in the range of 2-5 nm, the reduced grain size may give rise to grain boundary effects that provide technically useful structural and other properties.

Such technically useful nanostructured materials may have application in a wide range of fields including catalysis, ceramics, electronics, food technology, pharmaceutical technology and medical technology to name a few. Nanostructured materials to be used in such applications may be synthesised with tailored properties to the particular field of application.

For example, in a catalysis application, the nanostructured material may be synthesised to have significantly increased catalytic activity or effectiveness over the same catalytic material with a larger grain size (and larger scale microstructure). The resulting catalytic material may be described as a functional material with its properties tailored to the particular function that the material is to perform. Without wishing to be bound by any theory, the enhanced catalytic activity of such material may be explained with increased surface area and more active sites for catalysis as well as improved diffusion conditions, based on the Second Fick's law where, under a constant temperature, doubling the path for diffusion, would result in quadrupling the time needed for this diffusion to take place. Therefore, in the opposite nanometric scale case, material with finer grain structure would have increased activity due to the fact that more atoms are on the surface or closer to the surface and the diffusion path is shorter.

A difficulty arises in producing such materials on a bulk commercial scale in a cost effective manner. U.S. Pat. No. 7,220,398 provides a review of currently used processes for synthesising ultrafine and nanosized metal oxide powders and metal oxide coatings using chemical compounds as precursors. Processes for production of such materials may be classified as liquid-phase and gas-phase approaches. Key liquid phase approaches include sol-gel, precipitation, hydrothermal and electrochemical processing. Gas phase approaches include spray pyrolysis, metal evaporation/oxidation, plasma spray, flame spray pyrolysis, laser ablation, ion implantation, physical vapour deposition and chemical vapour deposition methods.

The liquid phase methodology is not suitable for commercial scale production of nanophased materials in a cost effective manner. In a sol-gel preparation method, multiple step syntheses are required, each step potentially requiring handling of volumes of solvents as well as solvent recycling. The process may be time consuming, upwards of 3 days. Production of nanostructured materials with the requisite properties may also require further thermal operations, such as drying and calcining. The synthesis scheme is thus complex and not commercially attractive though it may be suitable for laboratory applications.

Gas phase processes are thus preferred for the production of nanostructured materials. While much work has been done using gas phase processes, much of this work has focussed on avoidance and prevention of hazards arising from use of such processes as well as uncontrolled agglomeration of nanoparticles. For example, flame spray pyrolysis is the primary method for producing bulk quantities of ultrafine powders (e.g. titanium dioxide for use as the white pigment of paint) and nanopowders (e.g fumed silica and carbon black) and also thin film coatings for small electronic devices. Titanium dioxide and fumed silica are produced from volatile $TiCl_4$ and $SiCl_4$ compounds, or precursors, which are combusted to produce corresponding oxides. $H_2/O_2$ combustion flames are used for the combustion step. Such operations produce chlorine and hydrochloric acid, these needing to be handled in a safe manner. Therefore, work has been done to prepare precursor compounds which may be thermochemically converted into the required nanostructured material.

In addition, work has been done to prepare sub-micron mixed metal oxide powders while avoiding hazards such as those identified above. To this end, U.S. Pat. No. 7,220,398 proposes liquid feed flame spray pyrolysis of solutions of a metal oxide precursor which is an alkoxide or $C_{1-6}$ carboxylate and at least one second metal oxide precursor and/or second metal compound dissolved in oxygenated solvent. Such precursor material is then combusted with oxygen to form sub-micron mixed metal oxide powders not accessible by other processes or pyrolysis of metal chlorides or nitrates.

However, while such innovations may be useful, there are a range of applications to which nanostructured materials may be put, often in combination with other materials or substrates. Catalysis is one such application. There remains a need to provide processes for depositing nanostructured materials on to substrate materials, in particulate form, on commercial or bulk scale. It is an object of the present invention to provide such a process.

With this object in view, the present invention provides a process for depositing nanostructured material onto a particulate substrate material comprising the steps of:
 (a) preparing a precursor material;
 (b) forming an atomised dispersion containing nanophased material when subjecting said precursor material to elevated temperature;
 (c) contacting the atomised dispersion with the substrate material to deposit the nanophased material on the substrate material wherein said substrate material is in mobile and particulate form for contacting step (c).

Nanostructured single or multi-phase materials (alternatively referred to as nanophased materials) may take the form of nanosized particles or nanoparticles. By "nanophased" is intended that the coating contains at least one phase comprised or predominately comprised of nanosized grains of the desired coating material. Nanosized particles, or nanoparticles, having average particle size of usually less than 100 nm and average grain size of less than 20 nm, (in a preferred embodiment of this invention usually around 8-12 nm) may be formed during the atomisation process. It is possible to obtain a controlled particle size range for nanoparticles, for example within the range 10 to 20 nm on a reproducible basis. The particle size of the substrate material is desirably considerably larger, being in the order of many microns or tens of microns depending on the application. In this case, the average particle size of the mobile support particles was in the range of 70-100 microns.

Advantageously, contacting step (c) is conducted in a fluidised bed which allows good mixing of substrate particles with nanophased particles within the gas phase, formed by a suitable carrier gas, and enables a controlled deposition of nanophased particles onto the substrate material due to good surface contact between substrate particles and nanophased particles which may minimise loss of nanophased particles, a cost to prior processes as well as enabling better material handling properties. During the fluidised bed contacting process, nanoparticles may be deposited in one or more layers, forming a coating around substrate particles, this coating having nanostructure or microstructure and functionality tailored to a particular application such as e.g. catalysis. The coating may be said to form a nanophased layer of active substance with tailored properties. As already stated above, by "nanophased" is intended that the coating contains at least one phase comprised or predominately comprised of nano-sized grains of the desired coating material. The nanophased layer or coating could therefore include a single phase having nanosized grains of the desired coating material or a mixture of phases of desired coating material(s) each having nano-sized grains of the coating material. Multiple layers with the same or different desired coating materials may be deposited using this process. Nanostructured particle agglomerates may also be formed where the application of such larger agglomerates would be required. The resulting coating is, in any event, nanostructured.

The nature of the carrier gas which supports the fluidised bed may also be selected to enhance or promote particular process such as adhesion or bonding of the nanophased particles to the substrate particles. The carrier gas could also be inert or, alternatively, take part in any reaction involving the precursor material to form the desired species to be deposited on the substrate particles. The carrier gas should enable the integrity of the substrate particles to be maintained.

The formation of an atomised dispersion containing nanophased material in step (b) typically involves a thermochemical conversion of the precursor material to a precursor derivative. For example, the precursor material may comprise a metal compound, for example and preferably a metal chloride or nitrate, though organometallic compounds such as the alkoxides/carboxylates, mentioned in U.S. Pat. No. 7,220, 398, could also be employed. The precursor material may include a mixture of metal compounds such that a nanostructured material containing a mixture of metal compounds, such as metal oxides, may be formed in the process and then deposited on the substrate material. The metal is selected in accordance with the desired functionality of the nanostructured material for example catalytic activity. The metal may be a base metal (such as zinc or copper), nickel, chromium, cobalt, iron, an alkaline earth metal (such as magnesium, cerium), a precious metal (silver or gold), or a platinum group metal (such as platinum, rhodium, palladium and ruthenium).

This precursor material may be converted or reacted in a controlled gas atmosphere to form nanophased particles of a desired property. To illustrate, oxidation of a metal chloride or nitrate precursor material in an oxygen atmosphere would form a metal oxide precursor derivative, for example having a desired catalytic activity, which is then deposited onto the particles of substrate material. Another possible conversion mechanism is decrepitation of nitrate(s) by application of sufficient heat.

Other gases that could be employed during the thermochemical conversion step include hydrogen (where it is desired to deposit a metal or metal hydride), nitrogen and mixed gas atmospheres such as $CO$—$CO_2$ for providing metal-metal carbides (e.g. use as cermets), or $NH_3$—$H_2$ for metal-metal nitrides (e.g. use as cermets).

The precursor material may be delivered in powder form or dissolved in a wide range of solvents, both aqueous and organic. Water and organic solvents especially oxygenated compounds such as alcohols (for example the lower alcohols methanol and ethanol), carboxylic acids, aldehydes, ketones, ethers and so on may be employed as solvent. Preparation of a precursor material will typically involve dissolution of a precursor powder into solution. This solution could be dried, for example by spray drying, to form a chemically homogeneous precursor powder as described in PCT Publication No. WO 91/07244. Control over concentration of the precursor material may be practised to achieve desired morphology of the nanostructured material coated onto substrate material.

An aerosol of the solution may be formed prior to formation of the atomised dispersion of nanophased material typically by thermochemical conversion. In such case, the atomised solution may be directed into the zone having a controlled dispersion of droplets which is then subjected to evaporation, combustion, hydrolysis and/or pyrolysis to form the required nanophased material. The flowrate of atomised solution may be controlled to achieve desired morphology in the nanostructured material(s) coated onto substrate material. Such an aerosol may be formed by atomisation with a gas, for example one of those gas or mixed gas systems described above. In the case of a oxidation process, the gas would be oxygen or an oxygen containing gas. Where precursor material is introduced in powder form, the thermochemical conversion process itself may proceed in a fluidised bed. Precursor material or substrate particles may be pneumatically conveyed, by a suitable carrier gas, to the above mentioned zone and fluidised bed respectively.

Gas phase operations to form the nanostructured material may be selected from the group consisting of spray pyrolysis, plasma spray pyrolysis and flame spray pyrolysis. Spray pyrolysis and flame spray pyrolysis are particularly preferred approaches to thermochemical conversion of precursor material. In the case of flame pyrolysis processes one or more of various fuel gases may be combusted in a combustion zone to form a flame generating sufficient heat to conduct the required pyrolysis at the elevated temperature. By elevated temperature is intended a temperature usually between 1000° C. and 2500° C. (temperature measured close to the synthesis flame front), a temperature at which thermochemical conversion will proceed at required efficiency. The combustion gas may include LPG, a light hydrocarbon gas, such as methane, or synthesis gas. Other options are available. The combustion gas may be selected depending on the reactions required and the required temperature. Combustion may be initiated by methods such as spark discharge, glow plug or pilot flame.

The substrate material, prior to deposition of nanostructured material, is again selected with regard to the application the composite material (substrate and nanostructured material) is to perform. Where the composite material is to be a catalyst, the substrate material may be a support to be used for supporting catalysts in the particular process. For example, where the catalyst is to be used in a gas phase process, such as polymer production, catalytic cracking or a gas to liquids conversion process, the support may be selected from silica, alumina, aluminosilicates (such as zeolites) and zirconia and mixtures of these. For example, zinc oxide, possibly in admixture with copper oxide, and supported on alumina may play an important catalytic role in the steam reforming of methanol. Other multi metal oxide combinations may also be useful in catalytic applications. In such catalytic applications, the mean particle size of the substrate or support particles may be selected in the range 70-100 μm.

The nanostructured material may adhere or bond to the substrate material through various physical and/or chemical bonding mechanisms.

Where a pyrolysis step, particularly a flame or flame spray pyrolysis step, is used for thermochemical conversion, the flame pyrolysis zone and the flame may be located at a controlled distance from a fluidised bed of substrate particles. Such controlled distance enables a degree of control over heating of the fluidised bed and coating of nanophased material onto substrate particles. Heat delivery to the fluidised bed as well as bed temperature may then be controlled to promote adhesion or bonding of the nanophased material to the substrate material, as well as desired morphological characteristics in nanostructured material coating(s) onto substrate material, and should be done in such a way that would ensure temperature uniformity. Control over carrier gas rate is one means for controlling temperature uniformity. A secondary heat source for the fluidised bed may be required in certain circumstances but may advantageously be avoided. The fluidised bed of substrate particles may have a controlled thermal profile across the bed which may be assisted by external heating or cooling (like heat exchanger surfaces) if required to prevent bed overheating which could result in undesirable particle agglomeration or to otherwise regulate the fluidised bed temperature.

In another aspect, the present invention provides an apparatus for depositing nanostructured material onto a particulate substrate material comprising:
(a) a supply of a precursor material;
(b) a heating zone and means for heating the precursor material in said heating zone to elevated temperature at which an atomised dispersion containing nanophased material is formed; and
(c) a vessel for contacting the nanophased material with particles of a substrate material to deposit the nanophased material on the particles of substrate material
wherein said vessel contains mobile particles of substrate material during contacting. The vessel may include a fluidised bed of substrate particles in which the contacting with nanophased material takes place.

The apparatus may include an atomiser to atomise or nebulise the precursor material, where in solution form, which may then be thermo-chemically converted to form the desired nanophased material. An atomising gas may be introduced separately to the apparatus to assist the atomisation process if needed.

Elevated temperature may be achieved by heating the heating zone with a heater or with a combustion source such as a flame or arc. However, preferred processes for forming an atomised dispersion of nanophased material involve a thermochemical conversion step such as a pyrolysis, spray pyrolysis, flame pyrolysis or flame spray pyrolysis step. In such cases, the elevated temperature zone may be a furnace having a zone in which a fuel gas is combusted with a suitable oxidant, the resulting flame oxidising the precursor material to the desired nanophased material. In such cases, the heating zone is provided with a fuel gas supply and an ignition means to provide the combustion source. The fuel gas need not be limited to a hydrocarbon gas, other gas systems such as hydrogen, CO—$CO_2$ may also be introduced to the combustion zone.

The apparatus may also include offgas handling equipment (heat exchangers, particulate filters and so on) to collect fume and prevent safety hazards.

In a still further aspect, the present invention provides a particulate functional material comprising a core of substrate material and outer layer(s) of coating(s) of nanostructured material(s) deposited on the core of substrate material by a gas phase deposition process. Such nanostructured material(s) may advantageously be formed in the process and apparatus as described above. Processes for using such nanostructured functional materials are also included within the scope of the invention. Such a process could include a chemical process, such as a gas to liquids conversion process, in which the particulate functional material acts as a catalyst.

The process and apparatus of the present invention may be more fully understood from the following description of a preferred embodiment thereof made with reference to the accompanying drawings in which.

All of the above were subsequently coated with a range of nanostructured coatings (see further in the text).

Figure 1:
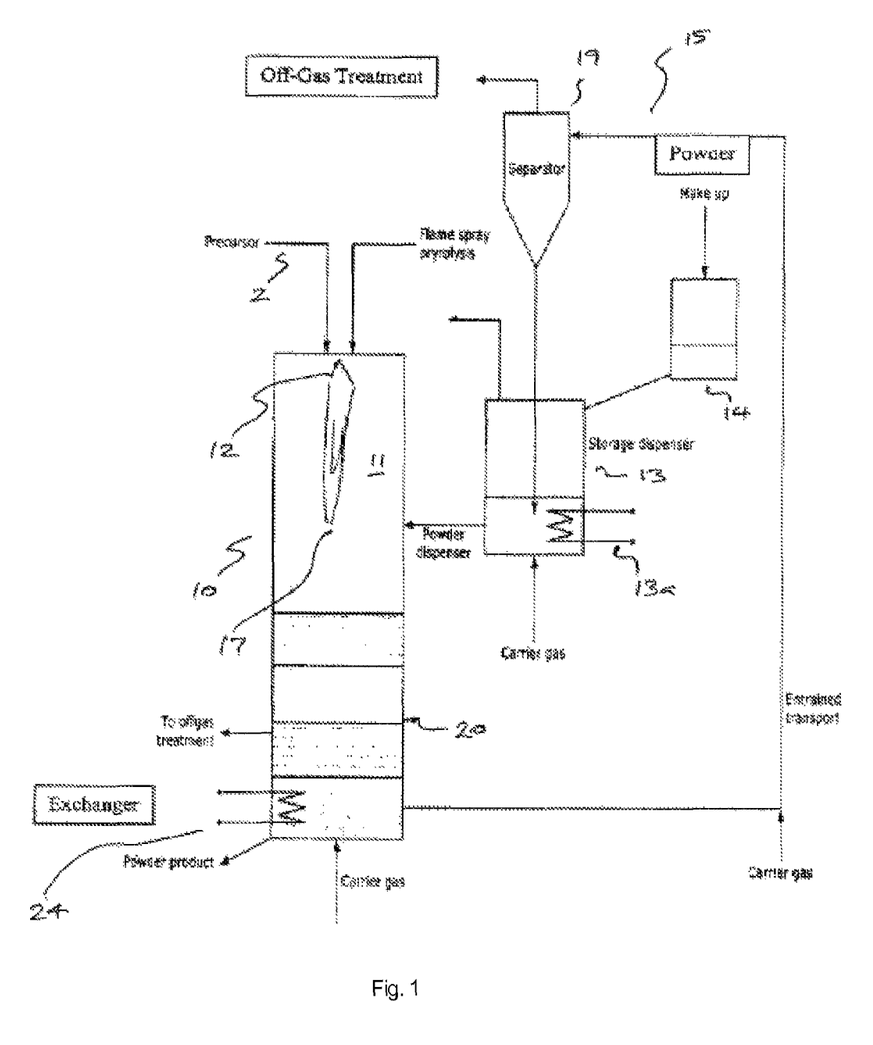
FIG. 1 is a schematic of an apparatus for depositing nanostructured zinc oxide material onto a substrate material in accordance with a preferred embodiment of the process and apparatus of the invention.

As illustration in this preferred embodiment, particles of zinc oxide material were to be deposited onto a particulate alumina substrate material or support to form a catalyst useful in an application such as the steam reforming of methanol using the deposition or coating apparatus shown schematically in FIG. 1.

The selected precursor material was a zinc chloride solution (1 M concentration in water) which was prepared for delivery as precursor stream 2 to a vessel 10, of heat and oxidation resistant material (in this case 316 stainless steel), in which the deposition of nanosized zinc oxide particles on to micron sized particles of alumina substrate or support material was conducted following combustion, through a thermochemical conversion process, of zinc chloride to zinc oxide in accordance with the reaction scheme:

$$2ZnCl_2 + O_2 \rightarrow 2ZnO + 2Cl_2$$

The combustion or thermochemical conversion process, which involved a flame spray pyrolysis operation, was conducted in a heating or combustion zone 11 formed within vessel 10.

To that end, an aerosol of the zinc chloride solution, this aerosol containing a dispersion of finely sized droplets of zinc chloride solution, formed by an atomiser (may be a nebuliser or spray nozzle), was sprayed into the vessel 10 for the combustion or pyrolysis operation at a rate of around 1.3 liters/minute. The spray nozzle was oriented to deliver the aerosol to a zone 11, which may be described as a flame pyrolysis zone or chamber proximate a gas burner 12. The gas burner 12 generated an elevated or high temperature, in the range 1200 to 2500° C., in the flame pyrolysis zone 11 by combustion of a fuel gas with an oxidant in the form of air, oxygen enriched air or oxygen. The fuel gas was a light hydrocarbon gas, a propane-butane mixture.

The burner 12 was located in vessel 10 such that the flame 17 generated during combustion was directed in a downward direction, this being advantageous in forming the required adhesion between the nanostructured zinc oxide particles and the substrate particles. The length of the flame 17 was controlled by control over pressure (80 kPa) of the fuel gas delivered to the gas burner 12. The bottom of the flame 17 was controlled to be at a controlled distance from the top of the fluidised bed 20 to be described below. This controlled distance was selected to promote sufficient heating to promote adhesion of zinc oxide nanoparticles to the alumina substrate or support particles without tending to promote particle aggregation which would be undesirable. For example, if the distance is too small, the deposited particles may not achieve complete thermochemical reaction or may agglomerate and form a thick low porosity layer. In the other extreme, i.e. if the distance is too large, the amount of the deposited nanostructured material would be less due to poor capture efficiency or loss of nanostructured material and hence, the overall catalytic efficiency of the coating would be decreased. Therefore, determination of a suitable distance may require a degree of trial and error to optimise these parameters. In the present example, the distance between burner 12 and fluidised bed 20 was set at 200 mm.

A number of processes, both physical and chemical, occurred in the flame pyrolysis zone 11. First, water or solvent was evaporated. Second, the zinc chloride was precipitated. In a final thermochemical conversion step, the zinc chloride was oxidised to zinc oxide. The atomisation process was controlled to provide the required size distribution of zinc oxide nanophased particles. The average particle size of these nanoparticles was between 10 and 20 nm.

Figure 2:
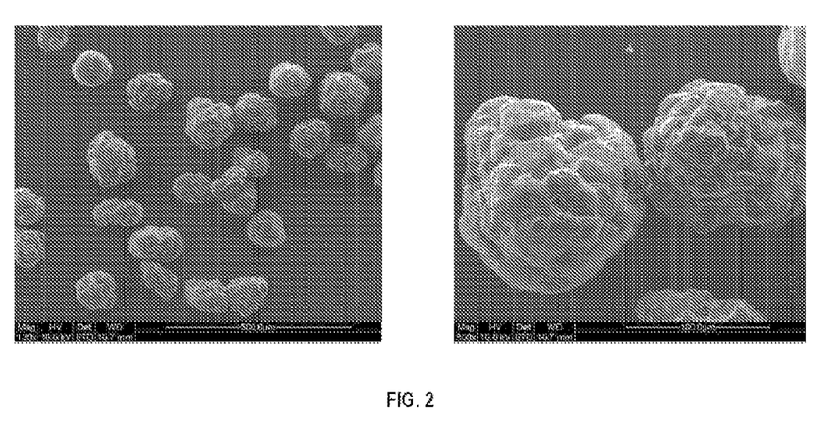
FIG. 2 is a Scanning Electron Microscopy (SEM) micrograph showing particles of an alumina substrate material to have zinc oxide deposited on them in the apparatus of FIG. 1.
Figure 2A:
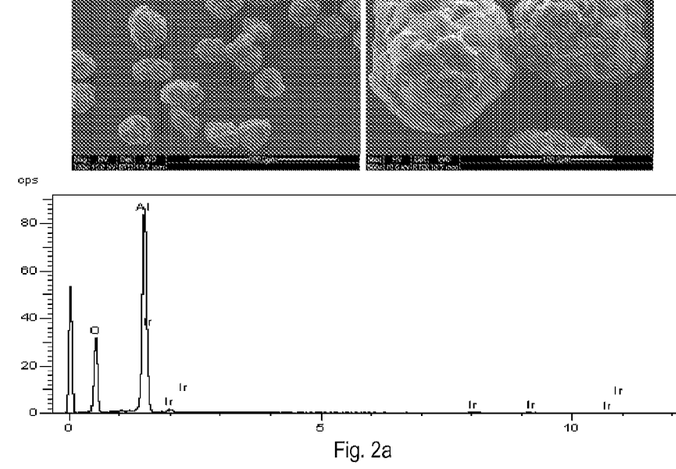
FIG. 2a is a SEM micrograph showing particles of an industrial grade alumina substrate material.
Figure 2B:
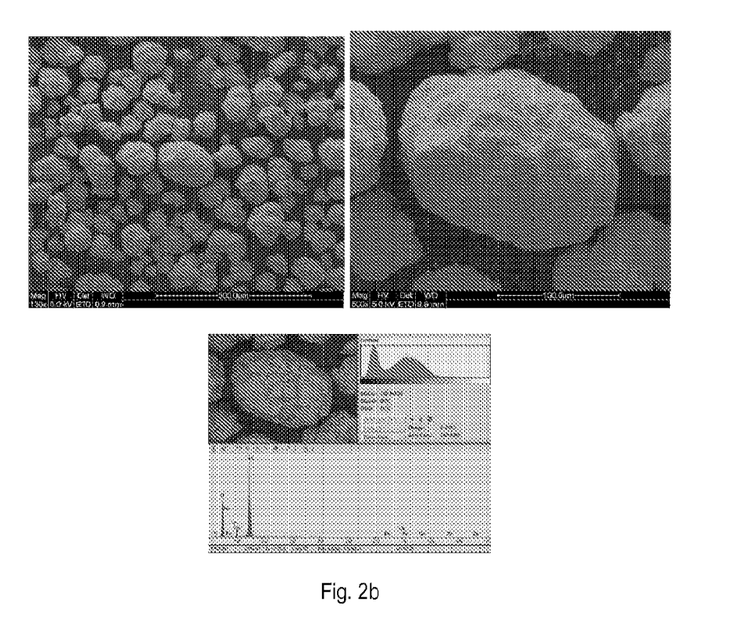
FIG. 2b is a SEM micrograph showing particles of a chemical grade alumina substrate material.
Figure 2C:
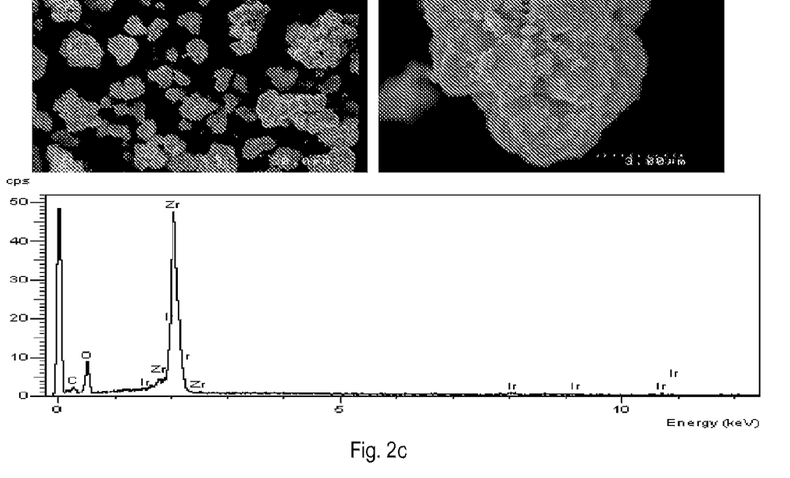
FIG. 2c is a SEM micrograph showing particles of a chemical grade zirconia substrate material.
Figure 2D:
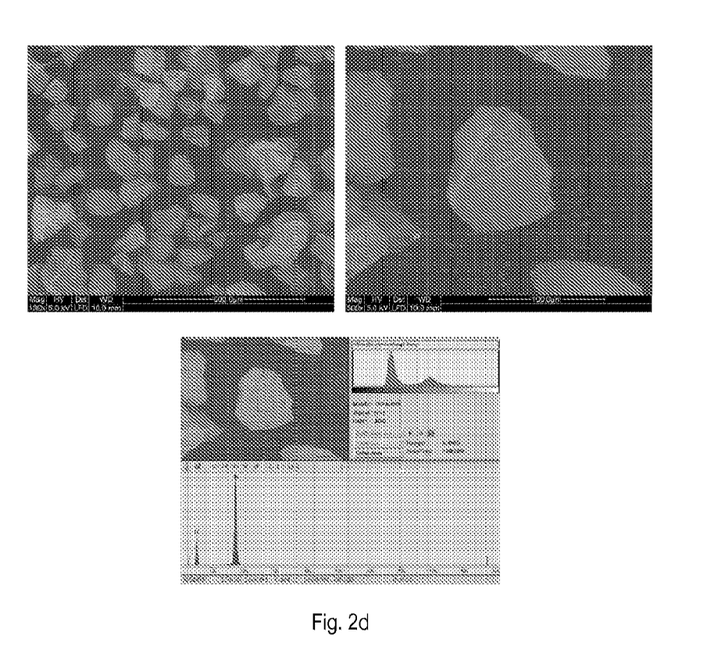
FIG. 2d is a SEM micrograph showing particles of a chemical grade silica substrate material.

Below the flame pyrolysis zone 11 was located a fluidised bed 20 of micron-sized alumina particles, having mean particle size in the range of 70 to 100 μm, which are mobilised in an inert carrier gas, in this case nitrogen. Argon could be used instead. The alumina substrate or support particles were preheated to 200-400° C., by heater 13a, in a suitable storage dispenser 13 prior to transport to the fluidised bed 20 by pneumatic conveying. Alumina particles, as illustrated in the SEM micrograph of FIG. 2, were delivered to the storage dispenser 13 from a make up stock 14 as alumina particles are delivered to the fluidised bed 20.

The fluidised bed 20 allowed good mixing of alumina substrate or support particles with the dispersion of condensing zinc oxide nanostructured particles, the motion of the carrier gas through the fluidised bed 20 creating agitation and a mass flow of particles and nanostructured particles which allowed deposition of a thin coating of nanostructured particles of zinc oxide on to the surface of the alumina support particles at average temperature in the vessel 10 of approximately 450° C. Temperature may be regulated, if necessary, as well as carrier gas preheated, by heat exchanger 24. The zinc oxide deposition process continued over a period of about 10 minutes.

Figure 3:
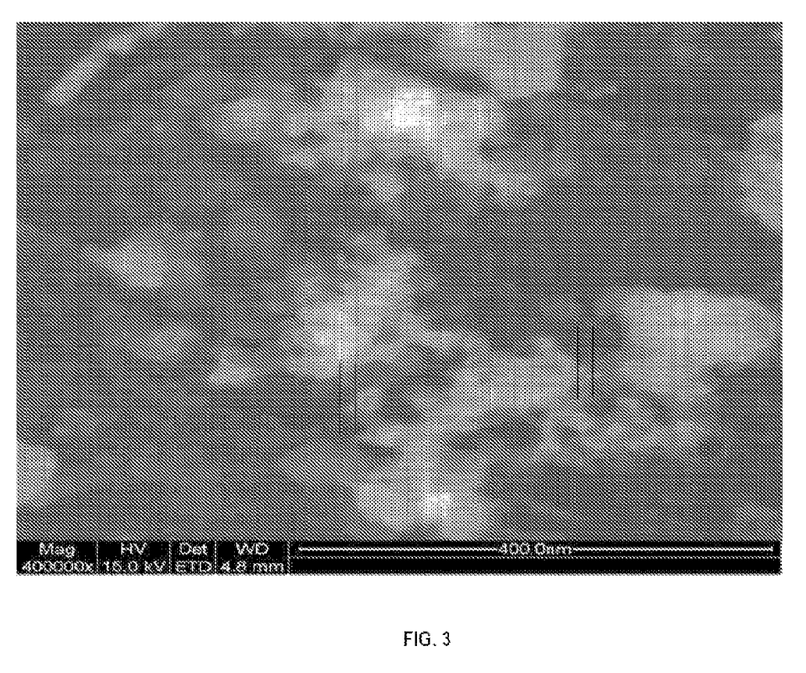
FIG. 3 is a SEM micrograph showing a particle of alumina substrate material following deposition of nanophased zinc oxide material on the surface of the particle in the apparatus of FIG. 1.

Subsequent SEM analysis of the coated alumina particles demonstrated that there is a nanostructured layer of zinc oxide on the surface of the alumina substrate or support particles, the nanostructure containing zinc oxide grains having average grain size in the range 10 to 15 nm, as illustrated by the SEM micrograph of FIG. 3. For the purposes of scaling, the distance between the marks in FIG. 3 is approximately $1/30^{th}$ (i.e 13.5 nm) of the 400 nm reference mark.

The zinc oxide coated alumina substrate or support particles were recovered in a suitable particle collection system 15 consisting of pneumatic transfer system, separate fluidized bed vessel and a cyclone or series of cyclones 19, the product particles being available as a catalyst, for example for a steam reforming process. The particle collection system 15 may allow for recycle of both, alumina and coated substrate or support particles, to the fluidised bed 20.

The apparatus for depositing a nanostructure of zinc oxide on to the surface of alumina substrate or support particles included gas handling processes (heat exchanger, particulate filters, etc.) to collect fume and prevent safety hazards arising in the deposition or coating process.

Other thermo-chemical reaction mechanisms are also possible, e.g. decrepitation:

$$Me_x(NO)_y + Heat = Me_xO_y + N_2$$

where:
$Me_x(NO)_y$ is a metal nitrate;
$Me_xO_y$ is a metal oxide

The examples shown in FIG. 4 to FIG. 8 were produced by following the above basic reaction mechanism and otherwise using the process and apparatus as above described. In this approach, 1 molar of zinc, iron, magnesium, nickel, chromium, cerium and cobalt nitrate solutions were prepared and were separately deposited onto various mobile support particles such as alumina (both chemical and industrial grades), chemical grade zirconia and chemical grade silica, SEM micrographs of each of which are shown in FIGS. 2a to 2d. Combinations of the above were also tried and successfully produced as well.

The results confirmed that different types of support particles were successfully coated and that all coatings were of nanostructured nature. It was also demonstrated that by varying some of the parameters of the process (see below for further details), properties of the nanostructured layers can be tailored as well.

Figure 4:
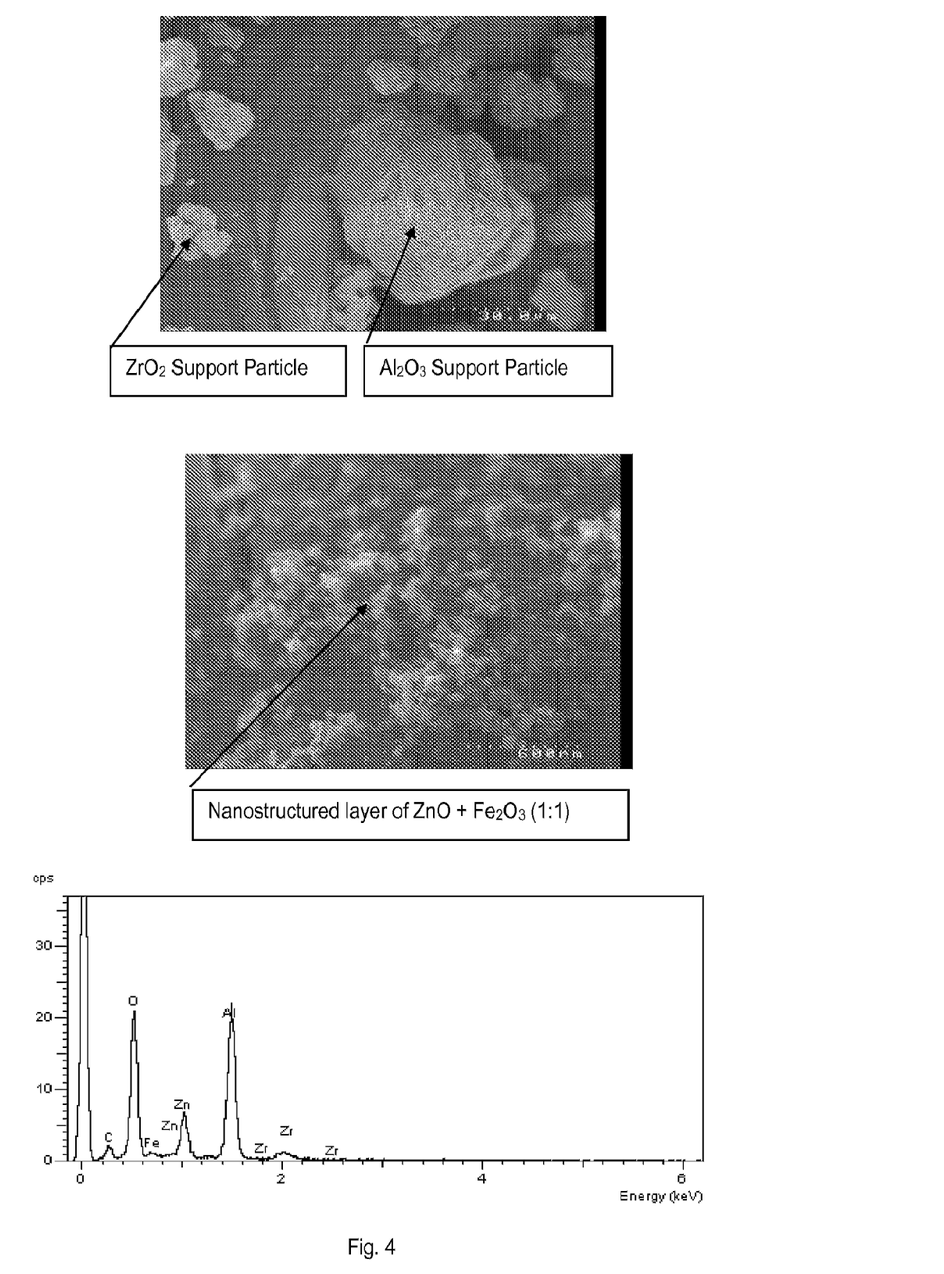
FIG. 4 is an EDXRA (Energy Dispersive X-ray Analysis) spectrum of alumina and zirconia mobile support particles coated with a 1:1 mixture of thin nanostructured ZnO and $Fe_2O_3$ layers.

Furthermore, the EDXRA results in FIG. 4 demonstrate that a thin nanostructured layer containing both ZnO and $Fe_2O_3$ (1:1 ratio) was simultaneously coated onto both $Al_2O_3$ (the large particles) and $ZrO_2$ (the small particles) support particles.

Figure 5:
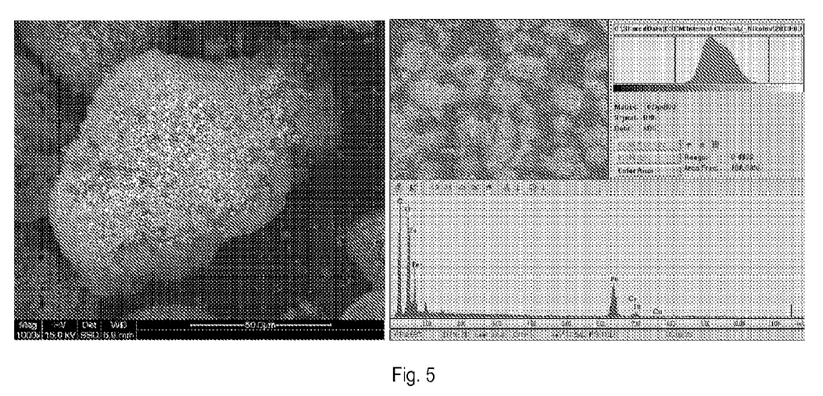
FIG. 5 is a SEM micrograph of a nanostructured layer of $Fe_2O_3$ onto a mobile alumina support particle.

The results in FIG. 5 show a thin layer of $Fe_2O_3$ onto industrial grade $Al_2O_3$ mobile support particle.

Figure 6A:
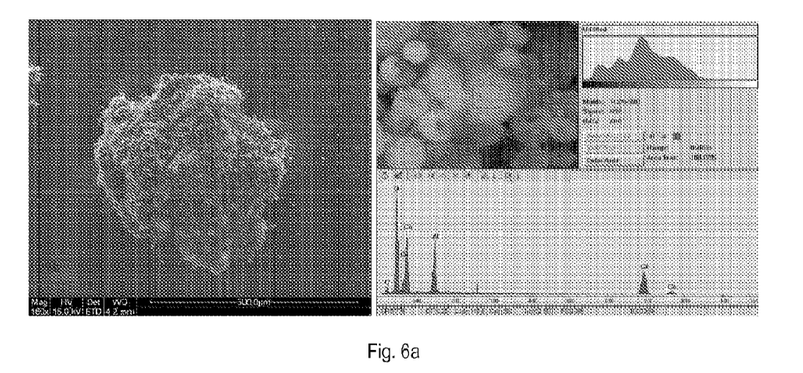
FIG. 6a is a SEM micrograph and EDXRA of a nanostructured layer of $CO_3O_4$ onto a mobile alumina support particle.
Figure 6B:
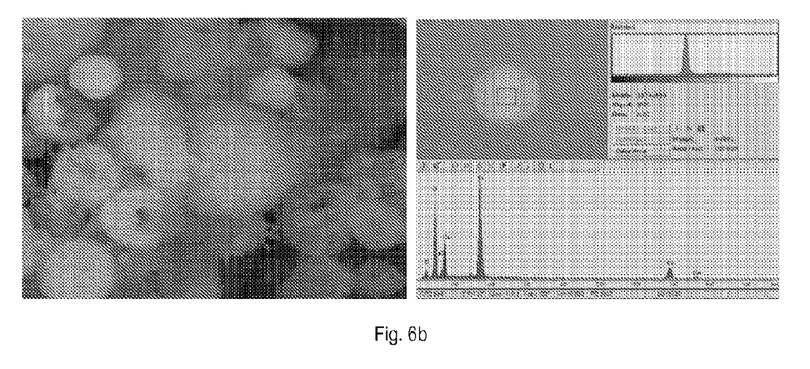
FIG. 6b is a SEM micrograph and EDXRA of a nanostructured layer of $CO_3O_4$ onto a mobile silica support particle.
Figure 7:
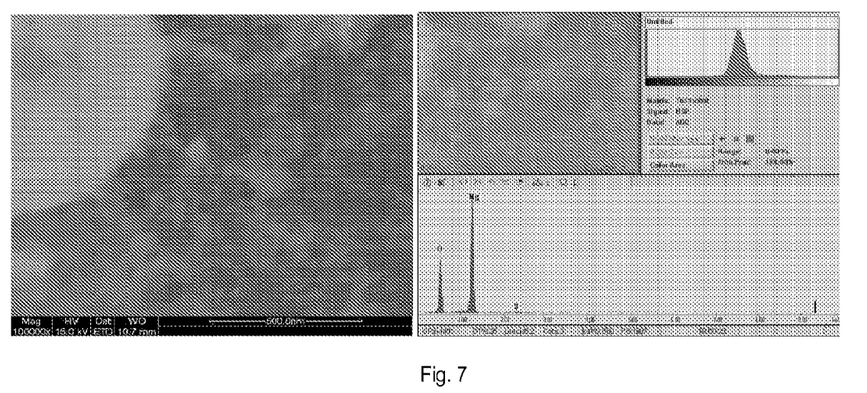
FIG. 7 is a SEM micrograph and EDXRA of a thick nanostructured layer of MgO onto substrate.
Figure 8:
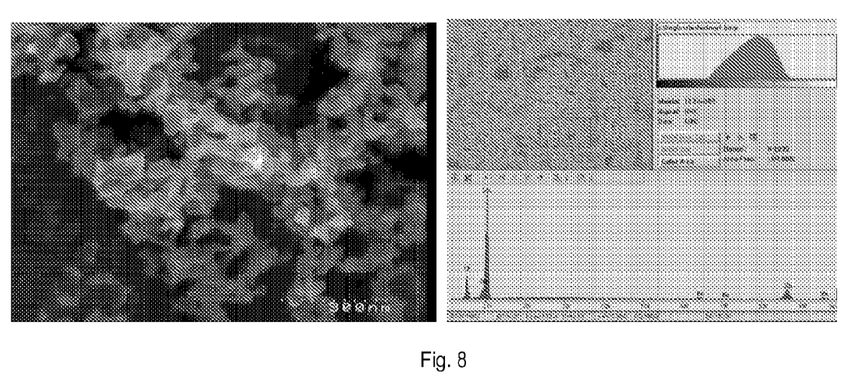
FIG. 8 is a SEM micrograph and EDXRA of a thick nanostructured layer of ZnO onto substrate.

Similar results can be found in FIG. 6 where $CO_3O_4$ was deposited as a thin layer onto alumina and silica particles respectively.

The thickness of the nanostructured coating would be proportional to the duration of the coating process, the concentration of the metal solution, the flowrate of the aerosol, etc. In addition, the morphological properties could also be tailored by varying other process parameters (e.g. distance between fluidised bed and flame, average temperature, etc) and the results shown on FIGS. 7, 8 and 9 demonstrate that different thicknesses of coatings with different tailored morphological properties can be produced by this method.

In particular, FIGS. 7 and 8 show the results where thick and uniform nanostructured layers of MgO and ZnO with average particle size of around 20-30 nanometers were successfully coated onto substrate surfaces.

Modifications and variations to the process and apparatus for depositing nanostructured material onto a substrate material of the present invention may be apparent to the skilled reader of this disclosure. Such modifications and variations are deemed within the scope of the present invention.

The invention claimed is:

1. A process for depositing nanostructured material onto a particulate substrate material comprising the steps of:
- preparing a precursor material dissolved in an aqueous or organic solvent;
- forming an atomised dispersion containing nanophased material by subjecting said precursor material to thermochemical conversion at elevated temperature;
- wherein said atomised dispersion of nanophased material is contacted with mobile and particulate substrate material to coat substrate material particles with nanostructured material.

2. The process of claim 1 wherein formation of said atomised dispersion containing nanophased material involves thermochemical conversion of the precursor material to a precursor derivative.

3. The process of claim 1 wherein said precursor material dissolved in a solvent is atomised prior to formation of said atomised dispersion containing nanophased material.

4. The process of claim 1 wherein said atomised dispersion of nanophased material is contacted with mobile and particulate substrate material in a fluidised bed.

5. The process of claim 1 wherein the precursor material comprises a metal compound or metal compound mixture.

6. The process of claim 5 wherein said metal is a nanostructured material.

7. The process of claim 6 wherein said metal has catalytic activity.

8. The process of claim 6 wherein the precursor material is converted or reacted in a controlled gas atmosphere to form nanophased particles.

9. The process of claim 8 wherein said controlled gas atmosphere is an oxygen containing atmosphere.

10. The process of claim 8 wherein said precursor material is dissolved in water.

11. The process of claim 8 wherein spray pyrolysis or flame spray pyrolysis processes are used for thermochemical conversion.

12. The process of claim 11 wherein a fuel gas is combusted in a combustion zone to form a flame generating sufficient heat to conduct pyrolysis at an elevated temperature of between 1000° C. and 2500° C.

13. The process of claim 11 wherein said substrate material is a support for supporting catalysts.

14. The process of claim 12 wherein said substrate material is a fluidisable material.

15. The process according to claim 14 wherein the mean particle size of the substrate material is selected for fluidisation.

16. The process of claim 12 wherein said atomised dispersion of nanophased material is contacted with mobile and particulate substrate material in a fluidised bed and said flame is located at a controlled distance from said fluidised bed.

17. An apparatus for depositing nanostructured material onto a particulate substrate material comprising:
- a supply of a precursor material dissolved in an aqueous or organic solvent;
- a heating zone and means for heating the precursor material in said heating zone to elevated temperature at which an atomised dispersion containing nanophased material is formed by thermochemical conversion; and
- a vessel for contacting the atomised dispersion of nanophased material with particles of a substrate material to deposit said nanophased material on said particles of substrate material;
- wherein said vessel contains mobile and particulate substrate material during contacting of substrate material particles with said atomised dispersion of nanophased material to coat substrate material particles with nanostructured material.

18. The apparatus of claim 17 including an atomiser to atomise the precursor material dissolved in a solvent.

19. The apparatus of claim 17 wherein said vessel includes a fluidised bed of substrate material particles in which said contacting with nanophased material takes place.

20. The apparatus of claim 17 wherein formation of an atomised dispersion containing nanophased material involves thermochemical conversion of the precursor material to a precursor derivative.

21. The apparatus of claim 17 wherein spray pyrolysis or flame spray pyrolysis are used for thermochemical conversion.

22. A particulate functional material comprising a core of substrate material and outer layer(s) of coating(s) of nanostructured material(s) deposited on the core of substrate material by a deposition process as claimed in claim 1.

23. The process of claim 5, wherein the metal compound or metal compound mixture comprises a metal chloride or nitrate.

24. The method of claim 14, wherein the aluminosilicates are zeolites.

25. The process of claim 15, wherein the mean particle size of the substrate particles is in the range 10-500 μm.

26. The process of claim 5, wherein the metal is selected from the group consisting of a base metal, nickel, cobalt, chromium, iron, cerium, another alkaline earth metal, a precious metal and a platinum group metal and mixtures of these.

27. The process of claim 14 wherein said the fluidisable material is selected from the group consisting of silica, alumina, aluminosilicates and zirconia and mixtures of thereof.

28. The process of claim 1, wherein the precursor material is dissolved in an aqueous solvent.

29. The process of claim 1, wherein the precursor material is dissolved in an organic solvent.

30. The process of claim 1 wherein said precursor material dissolved in a solvent is nebulised prior to formation of said atomised dispersion containing nanophased material.

31. The process of claim 1 wherein the precursor material comprises a metal compound.

32. The process of claim 1 wherein the precursor material comprises a metal compound mixture.

33. The process of claim 6 wherein the precursor material is converted in a controlled gas atmosphere to form nanophased particles.

34. The process of claim 6 wherein the precursor material is reacted in a controlled gas atmosphere to form nanophased particles.

35. The process of claim 8 wherein spray pyrolysis is used for thermochemical conversion.

36. The process of claim 8 wherein flame spray pyrolysis is used for thermochemical conversion.

37. The apparatus of claim 17, wherein the precursor material is dissolved in an aqueous solvent.

38. The apparatus of claim 17, wherein the precursor material is dissolved in an organic solvent.

39. The apparatus of claim 17 including an atomizer to nebulized the precursor material dissolved in a solvent.

* * * * *